Oct. 27, 1931.  J. A. HANLEY  1,828,895
ELECTRIC MOTOR
Filed June 18, 1930

INVENTOR
John A. Hanley,
BY
Wm H Canfield
ATTORNEY.

Patented Oct. 27, 1931

1,828,895

UNITED STATES PATENT OFFICE

JOHN A. HANLEY, OF IRVINGTON, NEW JERSEY, ASSIGNOR, BY MESNE ASSIGNMENTS, TO SCHICK DRY SHAVER, INC., OF STAMFORD, CONNECTICUT, A CORPORATION OF DELAWARE

ELECTRIC MOTOR

Application filed June 18, 1930. Serial No. 461,865.

This invention relates to an electric motor for use in the handles of tools and it is adapted for use particularly for tools having a reciprocating element at one end.

The object of the invention is to provide a motor for use with either direct or alternating current and one that will not become noticeably heated when running. The motor is also designed to have a minimum of vibration due to the balance and the relative position of the parts. The motor is compact and easily started and regulated.

The invention also resides in certain details of construction that will be hereinafter more fully explained and also embodied in the claims.

The invention is particularly adapted for use in shaving machines such as illustrated and described in Patent No. 1,747,031, dated February 11, 1930 and it is illustrated and described in connection with such a machine.

Figure 1:
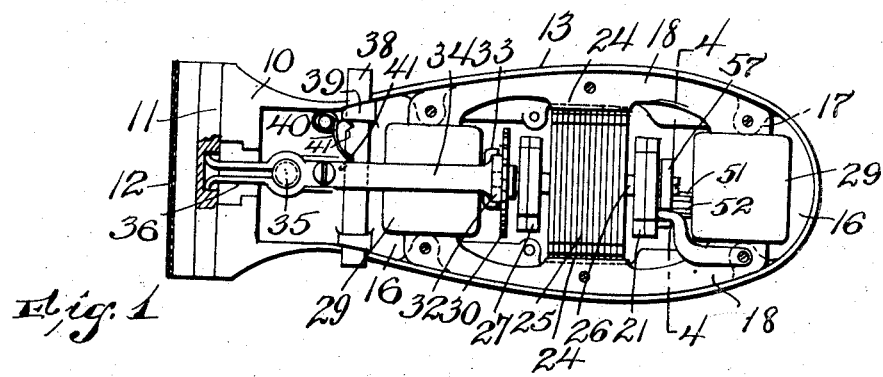
Figure 2:
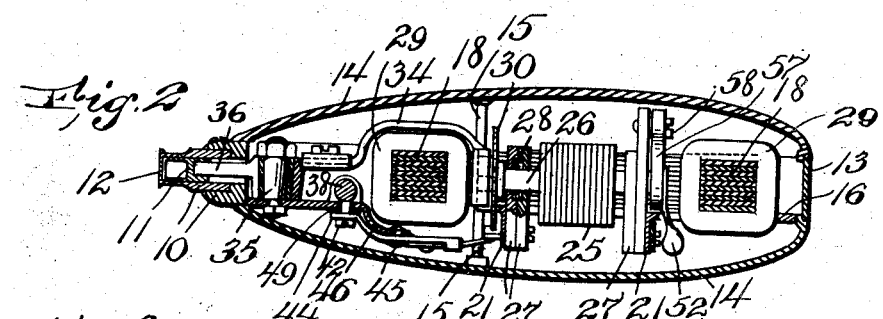
Figure 3:
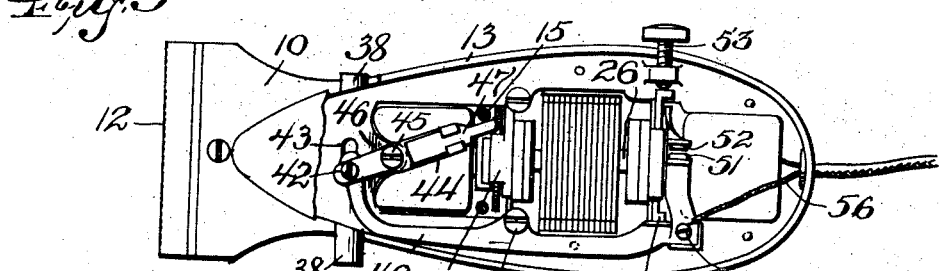
Figures 4, 5, 6:
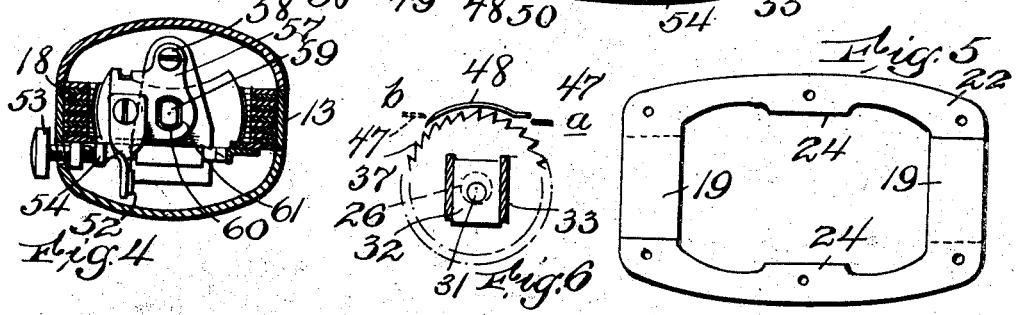
Figure 7:
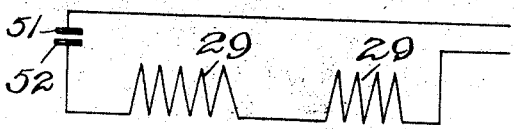

The invention is illustrated in the accompanying drawings in which Figure 1 is a bottom view of the motor mounted in a shaving machine with the bottom plate removed from the handle to clearly show the motor. Figure 2 is a central longitudinal section of the machine and the motor. Figure 3 is a top view of the motor and the machine. Figure 4 is a section on line 4—4 in Figure 1. Figure 5 is a plan view of the field member of the motor. Figure 6 is a detail of part of the starting mechanism. Figure 7 is a diagram of the circuit in which the motor is included.

The motor is illustrated as mounted in a shaving machine which consists of a shaving head 10 having reciprocating member 11 which co-operates with a perforated shear plate 12 to shave hair from the skin. This form of machine is well-known and no description of its details are incorporated herein. The shaving head 10 is provided with a handle. In the form shown this handle consists of a band 13 made of a die-casting integral with the head and of top and bottom plates 14 held in place by screws 15.

The band 13 supports the motor. The motor has a supporting or base plate 16 fastened to lugs 17 of the band by screws or bolts which also serve to hold the field member 18 of the motor. The field has an open frame work of laminated plates, the plates having end reaches 19 on which the coils 29 are located. The space between the coils is open except for strips bent down to form cross supports 21 for bearings for the armature shaft. The field member is made up as in Figure 5 with the L-shaped plates 22 assembled in two halves. The end arms are supplied with coils and then the two halves are slid together. It will be evident that each layer or lamination is reversed or, rather, turned over to break the joints where the members come together. This will be understood from the dotted lines at 23 showing the next plates underneath as abutting at these places.

The open field member is provided with laterally opposed central projections 24 between which the armature 25 rotates. The armature is secured on the shaft 26. The shaft rotates in bearings 27 secured to the cross-supports 21. The bearings are made of two sheets or plates of tough material that has a limited flexibility. This material may be of any of the usual commercial materials such as micarta or a similar fibre and two sheets are used placed face to face and the opposed faces are recessed to form a chamber in which the lubricant 28 is placed and thus makes the rotation of the shaft easy. It will be noted that the shaft is longitudinally arranged and rotates on an axis substantially in line with the axis or centre line of the handle. This arrangement causing the rotation of the armature in a plane perpendicular to the axis of the handle and in conjunction with the limited flexibility of the bearings causes but slight vibration of the handle when held in the hand and thus allows the shaving head to be held easily and steadily against the face in shaving. This is recognized as a necessity in a shaving machine and is possible by this construction.

The field member is designed to minimize the heating of the motor. The coils 29 are placed on the end reaches of the field member and the magnetic path is short as it passes around from both ends to the centre and then through the armature. The reluctance is reduced and the motor does not heat up to a material extent. The shaft 26 is equipped with a wheel 30 on which is an eccentric pin 31 fitting in a block 32 sliding between flanges 33 at one end of the oscillating lever 34. The lever is pivoted intermediate of its ends on a post 35 secured on the plate 16. The other end, 36, of the lever engages the sliding cutter 11. This end is usually made to spring slightly to soften the motion at the end of each stroke and thus make the operation smooth. This also provides for lost motion in the case of an obstruction or other cause of excess strain on the motor. It will be evident therefore that the ends of the oscillating lever and the shaft of the motor are substantially in line and the vibration is minimized on account of the absence of opposed motions.

The wheel 30 is also used for starting purposes and is therefore provided with teeth 37 (see Figure 6). The push rod 38 slides through the sides of the handle which can be marked or the rod can be marked to show "off" and "on" positions. The rod 38 slides in bearings 39 on the plate 16 and is held in its two positions by resilient means such as the spring 40 fitting in either of the two notches 41 in the rod. The rod has a pin 42 which projects through the slot 43 in the plate 16 and is connected thereby to the starting arm 44 pivoted at 45 to the leaf 46 struck up from the plate 16. The starting arm has a spring tip 47 of flat spring metal which is flexible flatwise or vertically and substantially stiff in a lateral or horizontal direction. The guide plate 48 is arranged over the starting wheel and has one edge above the normal plane of the tip and the other edge below said plane. This insures the tip 47 acting as a pawl to rotate the ratchet wheel 30 when in its starting movement from $a$ to $b$ in Figure 6 and also acts to lift the tip 47 and ride it over the pawl when shutting off the current as hereinafter described. This return movement is from $b$ to $a$ in Figure 6.

The switch arm or rod 38 also makes or breaks the electric connection to the motor. The arm is connected by pin 42 to the lever 49 (Figure 3), pivoted at 50 to the plate 16 and carrying the contact 51 at the other end. The contact 51 intermittently engages contact 52 and its movement can be limited by the regulating screw 53 which presses on the piece 54 against which the lever 49 abuts. The lever also carries a screw 55 for attaching the wire 56.

The contact 52 above mentioned is movable in proper timed relation with the armature. It is mounted on a plate 57 hinged at 58 to the rear bearing 27 and is oscillated by the flattened end 59 of the shaft 26 rotating in the hole 60 having flat sides 61.

I claim:—

1. An electric motor for hand tools with a laterally reciprocating element at the end thereof, the motor comprising a field member in the form of a frame, coils on the ends of the field member, an armature rotatable on a shaft in the longitudinal centre of the handle, a direct lever connection at one end of the shaft for reciprocating the element, a make and break device at the other end of the shaft, and a switch rod connected with the shaft for starting it and connected with the make and break device for controlling the current supply to the motor.

2. A motor for hand tools comprising an open frame forming a field member, coils at the ends of the field member, an armature rotatable in the centre of the field member and in a plane parallel with the coils, a shaft on which the armature is supported, a make and break device on the shaft and between the armature and one coil, a lever for operating a tool, a connection between the lever and the shaft, said connection being between the armature and the other coil and a switch rod slidable laterally and provided with a starting means at the lever connection and having a connection for controlling the make and break device.

In testimony whereof he affixes his signature.

JOHN A. HANLEY.